April 14, 1959     E. P. NEHER     2,881,995
VIBRATION DAMPING SHOCK ABSORBING SUPPORT
Filed Nov. 19, 1957
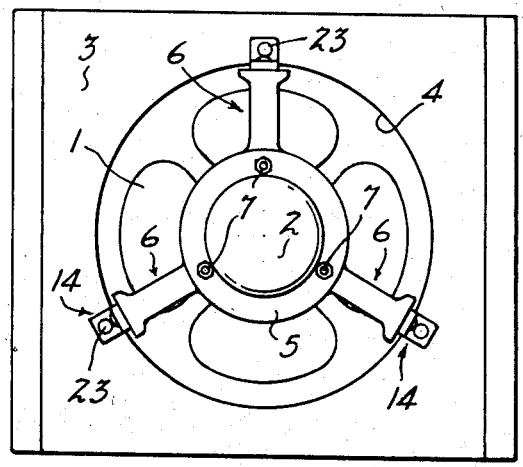
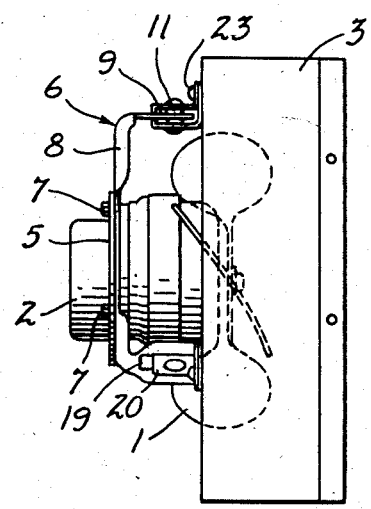
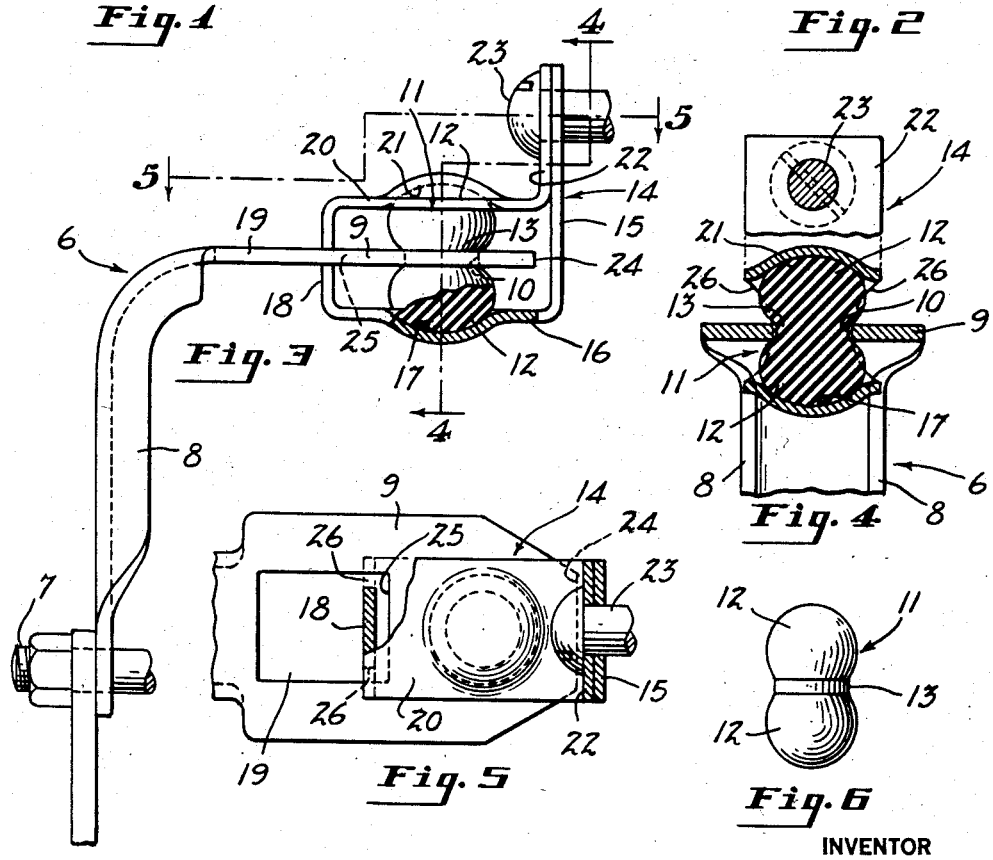
INVENTOR
*Eldon Paul Neher*
BY
ATTORNEYS United States Patent Office 2,881,995
Patented Apr. 14, 1959

2,881,995

VIBRATION DAMPING SHOCK ABSORBING SUPPORT

Eldon Paul Neher, Logansport, Ind., assignor to The General Tire & Rubber Company, Akron, Ohio, a corporation of Ohio Application November 19, 1957, Serial No. 697,466

6 Claims. (Cl. 248—15)

This invention relates to vibration damping, sound deadening and shock absorbing supports and more particularly to a support for isolating mechanisms in which vibrations are created during operation.

The support of the present invention includes a series of circumferentially spaced, elastic rubber cushioning elements that are interposed between brackets attached to a supporting structure and supporting members that extend from the brackets to a central supporting member on which the mechanism to be isolated is mounted. Each supporting member has a flat portion which carries one of the cushioning elements and each cushioning element has a central connecting portion that extends through an opening in the supporting member and elastic rubber end portions of ball-shape that engage with opposite sides of the supporting member. Each bracket has spaced parallel portions that receive the cushioning element between them and that have opposed concave seats in which the ball-shaped ends of the cushioning member engage. The cushioning elements serve to hold the supporting member and bracket out of contact with one another and to yieldingly resist relative movements of the supporting members and bracket in any direction. The cushioning elements are preferably in the form of one-piece molded rubber members that are placed in the supporting members by forcing one of the ball-shaped ends through the opening in the supporting member to position the cushioning element with its enlarged ball-shaped ends engaging opposite faces of the supporting member around the opening through which the connecting portion extends.

The support not only serves to dampen vibrations, but also serves to absorb shocks due to impact imposed either on the supporting mechanism or on the supporting structure and, in order to prevent displacement or damage to the cushioning elements, the supporting members and brackets are provided with interchangeable parts that serve as stops to limit the relative movements of the supporting member with respect to the brackets.

The invention has for its object to provide a simple, inexpensive and efficient vibration damping, sound deadening and shock absorbing support for a mechanism that is subject to vibration.

Reference should be had to the accompanying drawings forming a part of this specification, in which:

Figure 1 is a rear elevation of a ventilating housing with an electric fan supported by the vibration damping and shock absorbing support of the present invention;

Fig. 2 is a side elevation of the housing, fan and fan support;

Fig. 3 is a fragmentary side elevation of one of the brackets and its associated supporting member;

Figure 4 is a section taken on the line indicated at 4—4 in Figure 3;

Fig. 5 is a section taken on the line indicated at 5—5 in Fig. 3; and

Fig. 6 is a side elevation of the elastic rubber cushioning element.

In the accompanying drawings the invention is shown applied to the mounting of a motor driven fan 1 and its electric driving motor 2 in a ventilator housing 3. The fan is mounted in the housing to deliver air through an opening 4 in the wall of the housing upon which the fan is mounted. The motor 2 is attached to a central supporting ring 5 that is held in axial alinement with the opening 4 by means of a series of equiangularly spaced radially extending supporting members 6 that are attached to the ring 5 by means of bolts 7. The supporting members 6 are in the form of metal arms that have flanged radially disposed inner portions 8 and flat outer portions 9 that extend axially from the portions 8. Each flat end portion 9 is provided with an opening 10 which receives a cushioning element 11 that is provided with ball-shaped end portions 12 of elastic rubber and a central connecting portion 13. The cushioning element 11 is placed in the supporting member 9 by forcing one of its ball-shaped ends 12 through the opening 10. The width of the connecting portion 13 is substantially the same as the thickness of the member 9, so that the ball-shaped ends 12 engage opposite faces of the member 9 around the opening 10. The cushioning element is preferably in the form of a one-piece molded rubber block and the connecting portion 13 is preferably formed of a size to substantially fit in the opening 10.

Each cushioning element 11 provides a yielding support for one of the supporting members 6 in the supporting bracket 14 that is attached to the housing 2. Each of the brackets 14 is preferably formed from a flat metal strip bent to form a loop that receives the cushioning element and a portion for attachment to the housing wall. The bracket has a flat attaching portion 15, a portion 16 integral with the portion 15 and disposed at substantially right angles thereto that is provided with a concave seat 17 to receive the inner end of the cushioning element 11. Integral with the portion 16 there is a portion 18 substantially parallel with the attaching portion 15 that extends through an opening 19 in the flat outer end portion of a supporting member 6 and a return portion 20 substantially parallel with the portion 16 has a concave seat 21 that engages the outer end of the cushioning element 11. The portion 20 terminates in an out-turned portion 22 that overlies the wall engaging portion 15 to provide an attaching portion that is secured to the housing by means of a bolt 23. The portions 15, 16, 18 and 20 form walls of a rectangular loop which encloses the cushioning element.

The opening 19 which receives the wall 18 of the bracket loop is of a size to permit one of the seat carrying walls 16 or 20 to be passed through it when the support is assembled. In assembling the support the brackets 14 are assembled on the supporting arm 6 after the cushioning elements 11 have been assembled in the opening 10. Each bracket is opened up by spreading the attaching end portions 22 and 15 and the end portion 22 and wall 20 are threaded through the opening 19 and then bent back to loop closing position, putting the ball-shaped ends of the cushioning member under compression as shown in Figs. 2 and 4. To facilitate the threading of the loop through the opening 19, the bracket may be turned at an angle to the portion 9 of the supporting member during the threading operation and then swung to cushion engaging position after the wall 18 is positioned in the opening 19.

The portion of the supporting member disposed outwardly of the opening 19 is positioned within the loop formed by the walls 15, 16, 18 and 20 of the bracket loop and this portion of the supporting member has an end edge 24 that is normally spaced a short distance from the portion 15 of the bracket and the opening 19 has a marginal edge 25 that is spaced a short distance from the portion 18 of the bracket, so that relative axial movements of the supporting member with respect to the bracket are limited by the engagement of the edge 24 with the wall 15 of the bracket loop and by engagement of the edge 25 with the wall 18 of the bracket.

As shown in Figs. 4 and 5, the wall 18 of the bracket loop has scallops 26 in its opposite edges which reduce the width of the wall 18 intermediate its ends to less than the width of the opening 19 and the scallops 26 provide the wall 18 with tapering edges which provide shoulders inwardly and outwardly of the supporting member to limit relative radial movements of the supporting member with respect to the bracket.

The seats 17 and 21, the cushioning element 12 and the opening 10 are so arranged that each supporting member is held in a position out of contact with its supporting bracket, so that relative movements of the supporting members with respect to the brackets in any direction are cushioned. The axial movements of the supporting members with respect to the brackets are limited by engagement of the edges 24 and 25 of the supporting member with the walls 15 and 18 of the bracket loop, and the relative radial movements are limited by engagement of the inner and outer tapered portions of the wall 18 with the sides of the opening 19. Lateral movements of the supporting member are limited by engagement of opposite edges of the wall 18 with the opposite edges of the opening 19.

The support of the present invention serves as a shock absorbing cushion but, if by reason of an impact imposed either on the supported mechanism such as might be caused by impact of the fan against a solid object, or on the supporting housing such as might be caused by jolting of a vehicle carrying the assembly, there is an excessive movement of support with respect to the brackets, this movement will be limited by engagement of one of the above mentioned portions of the support with the adjacent portion of the bracket. By thus limiting the movement of the supports with respect to the brackets, movements that would displace the cushioning elements or subject them to excessive shearing stresses are prevented.

It is to be understood that in accordance with the provisions of the patent statutes, variations and modifications of the specific devices herein shown and described may be made without departing from the spirit of the invention.

What I claim is:

1. A vibration damping shock absorbing support comprising a central supporting member, a series of circumferentially spaced supporting members attached to said central member and having flat portions extending axially to one side of said central supporting member, the flat portion of each of said members having an opening therethrough, a cushioning element carried by each of said supporting members having elastic rubber ball-shaped cushioning portions engaging opposite faces of the flat portion thereof and a connecting portion extending through the opening therein, a supporting bracket for each of said supporting members, each of said brackets having spaced parallel portions that receive a cushioning element between them, and opposed concave seats in which the ball-shaped portions of the cushioning element are seated.

2. A vibration damping shock absorbing support comprising a central supporting member, a series of circumferentially spaced supporting members attached to said central member and having flat portions extending axially to one side of said central supporting member, the flat portion of each of said members having an opening therethrough, a cushioning element carried by each of said supporting members having elastic rubber ball-shaped cushioning portions engaging opposite faces of the flat portion thereof and a connecting portion extending through the opening therein, a supporting bracket for each of said supporting members, each of said brackets having spaced parallel portions that receive a cushioning element between them, and opposed concave seats in which the ball-shaped portions of the cushioning element are seated, said brackets and supporting members being held out of contact with another by the cushioning elements and having portions that are engageable to limit the relative movements of each supporting member with respect to its bracket in any direction.

3. A vibration damping shock absorbing support comprising a central supporting member, a series of circumferentially spaced supporting members attached to said central member and having flat portions extending axially to one side of said central supporting member, the flat portion of each of said members having an opening therethrough, a cushioning element carried by each of said supporting members having elastic rubber ball-shaped cushioning portions engaging opposite faces of the flat portion thereof and a connecting portion extending through the opening therein, a supporting bracket for each of said supporting members, each of said brackets having a substantially rectangular loop into which the flat portion of a supporting member extends, each loop having parallel portions with interior concave seats in which the ball-shaped portions of the cushioning element engage, each supporting member and the loop into which it extends being normally held out of contact by the cushioning elements and having portions that are engageable to limit the relative movements of each supporting member with respect to its bracket in any direction.

4. A vibration damping and shock absorbing support comprising a supporting member having a flat portion provided with an opening therethrough, a cushioning element having elastic rubber ball-shaped cushioning portions engaging opposite faces of said flat portion and a connecting portion extending through said opening, a supporting bracket having spaced parallel portions that overlie opposite faces of said flat portion of the supporting member, that receive said cushioning element between them and that are provided with oppositely facing concave seats to receive the ball-shaped portions of said cushioning elements between them.

5. A vibration damping and shock absorbing support comprising a supporting bracket having a portion formed to provide a substantially rectangular loop having two parallel sides provided with opposed concave seats and a third side integrally connected to said parallel sides, a supporting member having a flat portion extending into said loop and having an opening through which said third side of said loop extends, said flat portion having a second opening within said loop, a cushioning element of elastic rubber having ball-shaped ends engaging said seats and opposite faces of said supporting member and having an integral connecting portion in said second opening.

6. A vibration damping and shock absorbing support comprising a supporting bracket in the form of a metal strap having a portion formed to provide a substantially rectangular loop two sides of which are substantially parallel and provided with oppositely facing concave seats and a third side of which is integrally connected to said two sides, a supporting member having a flat portion extending into said loop and having an opening through which said third side of said loop extends, said opening being of a size to allow movement of said third side in any direction therein and to permit passage of one of said parallel sides therethrough, said supporting member having an opening within said loop, a cushioning element of elastic rubber having ball-shaped ends that engage said seats and opposite sides of said supporting member around said circular opening and a central connecting portion that substantially fits in said opening, said cushioning element being positioned by said second opening and said seats to hold said supporting member out of contact with said bracket and to cushion relative movements thereof in any direction, said bracket and said supporting element having portions that are engageable to limit relative movements thereof in any direction.

References Cited in the file of this patent

UNITED STATES PATENTS

| | | |
|---|---|---|
| 1,964,432 | Geyer | June 26, 1934 |
| 2,462,011 | Thiry | Feb. 15, 1949 |
| 2,728,541 | Hansel | Dec. 27, 1955 |